United States Patent

Schoep et al.

[15] 3,649,917

[45] Mar. 14, 1972

[54] SOLID-STATE TEST OSCILLATOR-TRANSMITTER HAVING CAVITY

[72] Inventors: Vernon R. Schoep; Carl N. Bullai, both of Boulder, Colo.

[73] Assignee: Ball Brothers Research Corporation, Boulder, Colo.

[22] Filed: Oct. 14, 1968

[21] Appl. No.: 767,327

[52] U.S. Cl. ..............................325/105, 325/119, 325/125, 331/96, 331/117

[51] Int. Cl. ..........................................................H03b 5/24

[58] Field of Search..................325/105, 119, 101, 125, 127, 325/128, 129; 331/68, 96, 97, 101, 108, 108.3, 117

[56] References Cited

UNITED STATES PATENTS

| | | | |
|---|---|---|---|
| 2,565,113 | 8/1951 | Baker | 331/96 |
| 2,680,229 | 6/1954 | Lambert | 331/96 X |
| 2,731,562 | 1/1956 | Miyaji | 331/96 X |
| 2,817,761 | 12/1957 | Hollmann | 331/96 X |
| 3,204,199 | 8/1965 | Lance | 331/117 |
| 3,270,292 | 8/1966 | Harwood | 331/97 |
| 3,290,614 | 12/1966 | Racy | 331/101 X |
| 3,315,180 | 4/1967 | Racy | 331/117 |
| 3,343,103 | 9/1967 | Schoniger | 331/97 |
| 3,349,341 | 10/1967 | Schoniger | 331/97 X |
| 3,393,378 | 7/1968 | Bene et al. | 331/101 X |
| 3,271,698 | 9/1966 | Adams | 331/117 |

*Primary Examiner*—Benedict V. Safourek
*Attorney*—Campbell, Harris & O'Rourke

[57] ABSTRACT

A compact solid-state oscillator-transmitter which includes a transistor within a small can defining a tuning cavity. The can is electrically connected in the output circuit to present a capacitance which may be varied by manual adjustment of a tuning screw so that the effective output impedance, including parasitic impedance, has the proper phase angle necessary to permit oscillation at the desired frequency. The can is also utilized to shield radiation of radiofrequency conducting circuit components, to secure the components, and to protect the same against adverse environmental influences. A probe is provided to pick up oscillatory signal energy in the cavity and is utilized as an antenna when transmitting the produced signal.

8 Claims, 12 Drawing Figures

INVENTORS
VERNON R. SCHOEP
CARL N. BULLAI
BY
Campbell, Harris & O'Rourke
ATTORNEYS INVENTORS
VERNON R. SCHOEP
CARL N. BULLAI
BY
Campbell, Harris + O'Rourke
ATTORNEYS INVENTORS
VERNON R. SCHOEP
CARL N. BULLAI
BY
Campbell, Harris & O'Rourke
ATTORNEYS

SOLID-STATE TEST OSCILLATOR-TRANSMITTER HAVING CAVITY

BACKGROUND OF THE INVENTION

1. Field of the Invention

The invention relates to a solid-state oscillator-transmitter and more particularly to a solid-state oscillator that is particularly well suited for use as the essential component of a transmitter.

2. Description of the Prior Art

In the field of telemetry, transmitters are often subjected to highly adverse conditions. This is particularly true in sonde devices utilized to monitor meteorological and weather data. These conditions are experienced in both the balloon-borne and rocket-borne sonde device. For instance, a rocket-borne device having a transmitter to send weather data must be capable of continuous operation during exposure to accelerations of over 100 times gravity during launch of the rocket, severe vibrations, altitudes extending beyond the atmosphere, high humidities, and wide temperature ranges often of 50° C. above and below zero.

The transmitter must also be light in weight and small in size but yet must be sufficiently rugged to withstand the severe conditions likely to be encountered. The devices also must operate efficiently with a small compact power supply without hindering reception at earth receiving locations of the weather and other meteorological data signals.

Heretofore, it has been common to utilize solid-state devices to effect transmission of such data signals at carrier frequencies often in the L-band, such as at 1,680 MHz. However, the signal transmitted from early model solid-state devices was commonly a harmonic of the oscillator signal since parasitic impedances, incurred in the utilization of lumped elements, limited the oscillation frequency well below the L-band range. Transmission of harmonics, however, requires additional components such as, for example, filtering units which in turn increase weight and consume power.

More elaborate transmitters which followed, illustrated the desirability of utilizing transistors with resonant cavities. since the use of such cavities enabled use of a fundamental frequency in the L-band. Further, reactances presented by cavities are relatively stable over wide temperature variations and therefore normal operation may be attained over such ranges without undesired variation of impedances and consequently of the carrier signal frequency.

A transmitter utilizing a transistor and cavity structure is illustrated and discussed in an article entitled, "A New Low Cost Fundamental Frequency Rocket-Sonde Transmitter" by Robert R. Lorentzen, published in *Electrical Communicator*, Feb. 1968, page 10. However, such devices require multiple cavities to obtain transmitter stability, the length of each cavity being necessarily at least one-quarter wavelength of the carrier frequency signal. Further, the devices utilized internal impedance elements such as capacitors in the cavity in both the emitter-to-collector and base-to-collector circuits in order to obtain the high Q-tuned circuit to overcome parasitic reactances. As already stated, it is desirable to avoid the use of lumped capacitive elements.

The present invention, however, satisfies the conditions of ruggedness and operational stability under the adverse conditions aforenoted; and additionally meets the crucial requirements of being lighter and smaller than the more recent solid-state devices while yet retaining good power efficiency. It has been found possible to achieve this result by utilizing the parasitic impedances as effective tuning elements thereby eliminating the need for the multiplicity of reactive circuit elements and permitting the use of a cavity less than one-quarter of the carrier signal wavelength. The simple oscillator circuit of relatively few elements is mechanically rugged and the can itself is used both for tuning and as a radiative shield.

SUMMARY OF THE INVENTION

The invention as described herein is a lightweight, small, and compact oscillator-transmitter, transmission being from a small antenna probe of a data signal modulated carrier.

It is accordingly an object of the present invention to provide a small and lightweight oscillator having a transistor connected to a metallic can defining a cavity of length less than one-quarter wavelength of the transmitted signal.

It is a further object of the invention to provide a small, compact transmitter having a metallic can as an impedance presenting element in the feedback signal path of the oscillator of the transmitter, and which can defines a single cavity less than one-quarter wavelength of the transmitted signal.

Another object of the present invention is to provide, in a transmitter, an oscillator having a can defining a single cavity and capable of producing a radio frequency L-band fundamental signal which may be transmitted over long distances.

Another object of the invention is to provide a lightweight oscillator incorporating a metallic can defining a cavity, the can rendering the overall output impedance of the transistor of magnitude and sense necessary for oscillation.

A further object of the invention is to provide a compact oscillator having a transistor, and a can defining a cavity to present an impedance which may be adjustably tuned with respect to inherent and fixed parasitic impedances of the oscillator.

Another object of the invention is to provide a compact oscillator having a transistor and a tuning can defining a cavity in the collector-to-base circuit of the transistor to render the reactance between the collector and base substantially inductive.

A further object of the invention is to provide a compact oscillator having a center conductor within a tuning cavity, the center conductor being a single plate of a pair of parallel connected capacitors.

Another object of the invention is to provide in a transmitter an oscillator having a transistor with collector-to-base and collector-to-emitter reactive circuit elements tuned with parasitic impedances between the same respective electrodes to offset the frequency limitations caused by the inherent parasitic reactances in the transistor and lead connections.

With these and other objects in view, which will become apparent to one skilled in the art as the description proceeds, this invention is encompassed in the novel construction, combination and arrangement of parts substantially as hereinafter described and more particularly defined by the appended claims; it being realized, however, that changes in the precise embodiment of the invention disclosed herein are meant to be included as come within the scope of the claims.

DESCRIPTION OF THE PREFERRED EMBODIMENT

Figures 1, 2, 3:
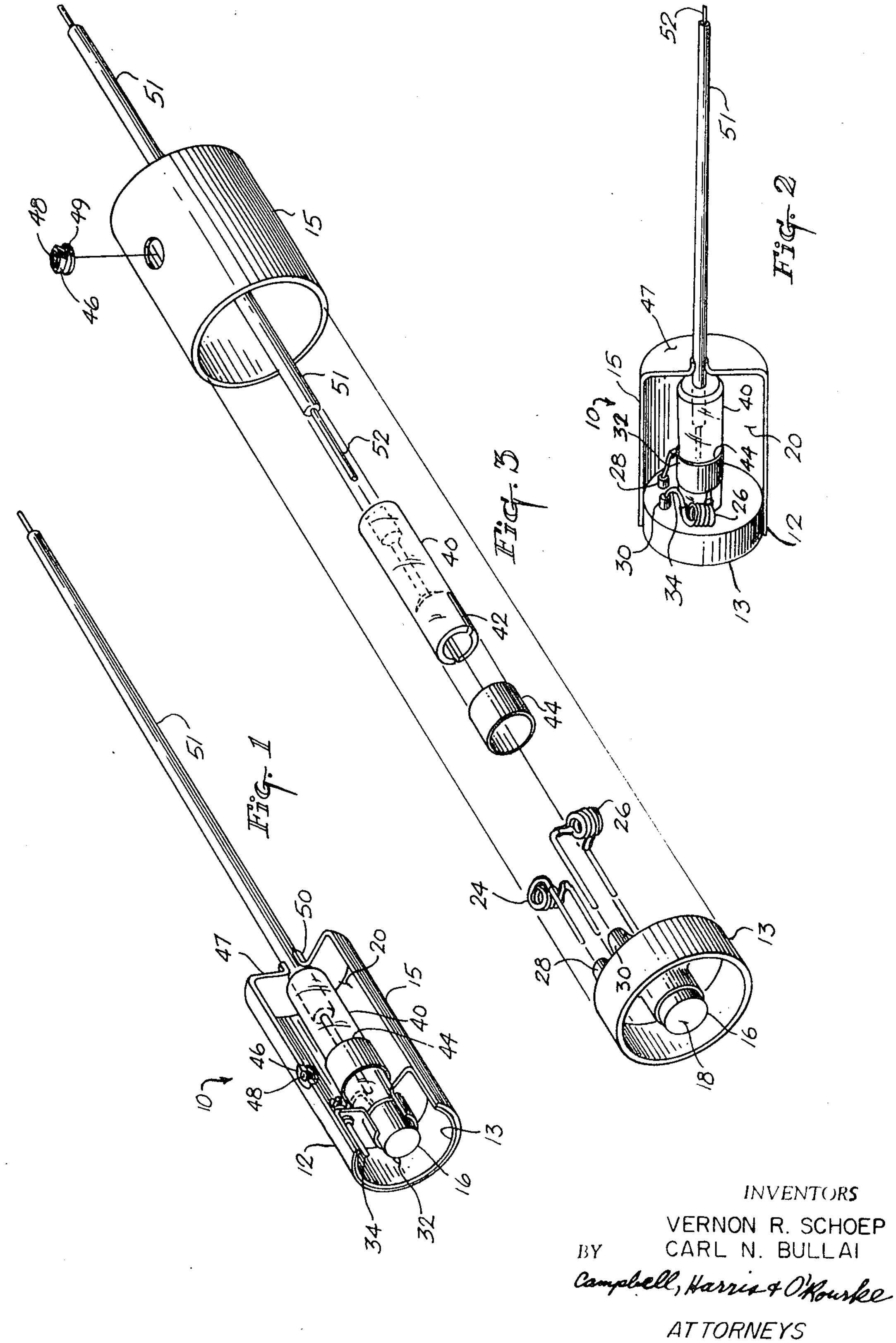
FIG. 1 is a partially cutaway perspective view of the oscillator-transmitter of this invention.
FIG. 2 is a partially cutaway perspective view from the opposite end of the oscillator-transmitter shown in FIG. 1.
FIG. 3 is an exploded perspective view of the oscillator-transmitter as shown in FIG. 1.
Figure 4:
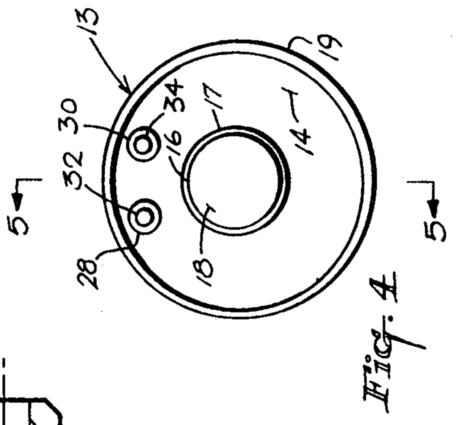
FIG. 4 is a rear view of the cap of the oscillator-transmitter as shown in FIGS. 1 through 3.

Referring to FIGS. 1 and 2, an oscillator 10 is shown which includes a hollow housing, more particularly a can 12 of electrically conductive material, for instance, such as soft brass. The can includes a cap 13 and a cylinder 15, the cap being inserted within one end of the cylinder. The cap 13, as particularly shown in FIGS. 4 and 5, has a disc-shaped portion 14 with a centrally disposed neck 17 for receiving a transistor 16 in squeeze fit relation, and a cylindrical flange 19 concentric with disc portion 14. For purposes of example, a cylinder suitably used in an oscillator built in accordance with the invention measured approximately 1.5 inches in length and 1 inch in outer diameter.

The transistor 16 is of a conventional type, such as an RCA 2N5108, manufactured in a cylindrical metal can 18 with the collector of the transistor internally connected (not shown) to the cylindrical can 18 so as to minimize collector lead inductance and resistance. In this manner, the collector is electrically connected to the can 12 which defines a cavity 20.

Figure 6:
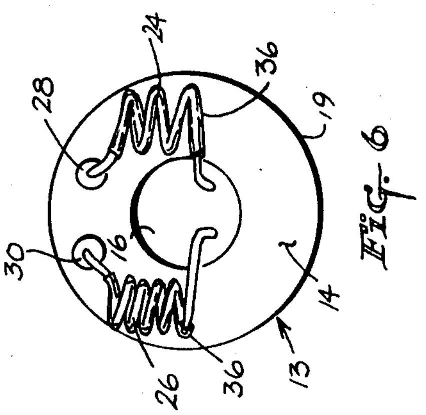
FIG. 6 is a front view of the cap of the oscillator-transmitter shown in FIG. 4.

A pair of coils 24 and 26, particularly shown in FIGS. 3 and 6, each extend adjacent the disc portion 14 of cap 13. For purposes of example, coils found suitable for use in the invention as coils 24 and 26 are of No. 20 gauge wire having 2¾ and 4¾ turns, respectively, each in 0.25 in. and extending along substantially opposite portions of the disc 14. Coil 24 is connected between an electrode of the transistor 16 and a feed-through capacitor 28; and coil 26 is connected between another electrode of the transistor 16 and a feed-through capacitor 30. The disc portion 14 of cap 13 has a pair of openings through which extend the feed-through capacitors 28 and 30 which may be soldered within the disc portion. As particularly shown in FIGS. 4 and 5, end portions 32 and 34 of coils 24 and 26, respectively, extend through feed-through capacitors 28 and 30. The feed-through capacitors 28 and 30 are of conventional type and insulate the conductive end portions 32 and 34 from the metallic cap 13. It may be appreciated that the terminology "feed-through capacitors" is adopted and hereafter used as a term of the art in referring to the elements 28 and 30. However, each is primarily only a single plate and dielectric material of respective capacitors formed when conductors, such as end portions 32 and 34, are inserted therethrough. A capacitance then exists between the disc portion 14 of the cap and the conductive end portions 32 and 34 through the feed-through capacitors 28 and 30, respectively, which presents a low reactance to signals at the frequencies of oscillation as more fully hereinafter described. An epoxy (not shown) or other suitable hardener may be utilized to fill the cap 13 between neck 17 and flange 19 so as to permanently maintain the position of transistor 16 and conductive end portions 32 and 34 in the cap. Dielectric sleeves 36 having dielectric properties which remain relatively constant over wide temperature variations are inserted on each of the coils 24 and 26 to maintain spacing of the coils from the disc portion 14 and to prevent a short circuit from the coils to the cap. For purposes of example, a material suitably used as the sleeve is commercially available Teflon (tetrafluoroethylene). Further it has been found preferable to restrain the coils, in addition to the restraint imposed by the connections to the coils, with a polystyrene adhesive.

Figure 5:
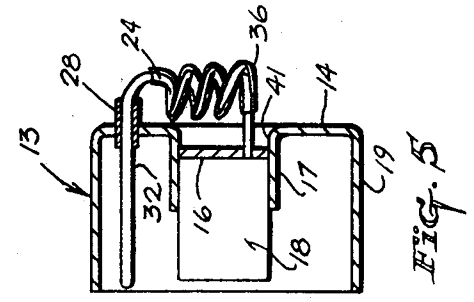
FIG. 5 is a view taken along the lines 5—5 of FIG. 4.

A dielectric support rod 40, also having dielectric properties which remain relatively stable over wide temperature ranges, extends axially within the cylinder 15 of can 12, and as shown in FIG. 3, is received at one end adjacent transistor 16 in a recess 41, as shown in FIG. 5, created by the neck 17 of cap 13. Rod 40 has a pair of slots 42 disposed off center of the rod so that the end of the rod may fit over the ends of each of the coils 24, 26 common to respective electrodes of transistor 16. A rod found suitable for use in the invention is sold under the name of "Rexolite," American Enka Corporation, Brand-Rex Division, Willimantic, Connecticut.

Rod 40 concentrically mounts a seamless cylinder 44 of conductive material such as copper for instance, which cylinder is soldered to one end of coil 26. For purposes of example, a cylinder suitably used in the invention measured 0.3 inch in length and 0.4 inch in outer diameter.

The cylinder 15 has an opening, as particularly shown in FIGS. 1 and 3, for receiving a bushing 46 which is soldered therein. An adjustable tuning screw 48 having an integral plate 49 is threadedly engaged within the bushing and is radially movable so that the distance between the plate 49 and the cylinder 44 may be varied. An end face 47 of cylinder 15 also has a central opening at a neck 50 to receive an axially extending coaxial line 51 having an inner conductor or probe 52, and an outer conductor which is electrically connected at neck 50 with cylinder 15.

Figure 7:
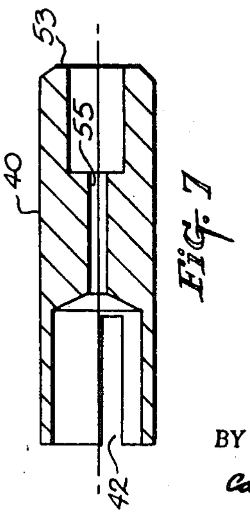
FIG. 7 is a cross-sectional view of the support rod element of the oscillator-transmitter shown in FIGS. 1, 2 and 3.

As shown in FIG. 7, the support rod 40 is hollow at an end 53 and also has an axially extending hole 55. The coaxial line 51 is received within end 53 with probe 52 extending through hole 55. The cylinder 44 is therefore substantially concentric about the exposed end of probe 52; and the dielectric rod 40 mechanically restrains the probe 52 from vibration. The opposite end of coaxial line 51 may also have the outer conductor cut away so as to expose probe 52 outside of cylinder 15. The probe may be utilized as an antenna and preferably should be exposed for at least one-quarter wavelength of the signal at the frequency of oscillation when used for such a purpose.

Figure 8:
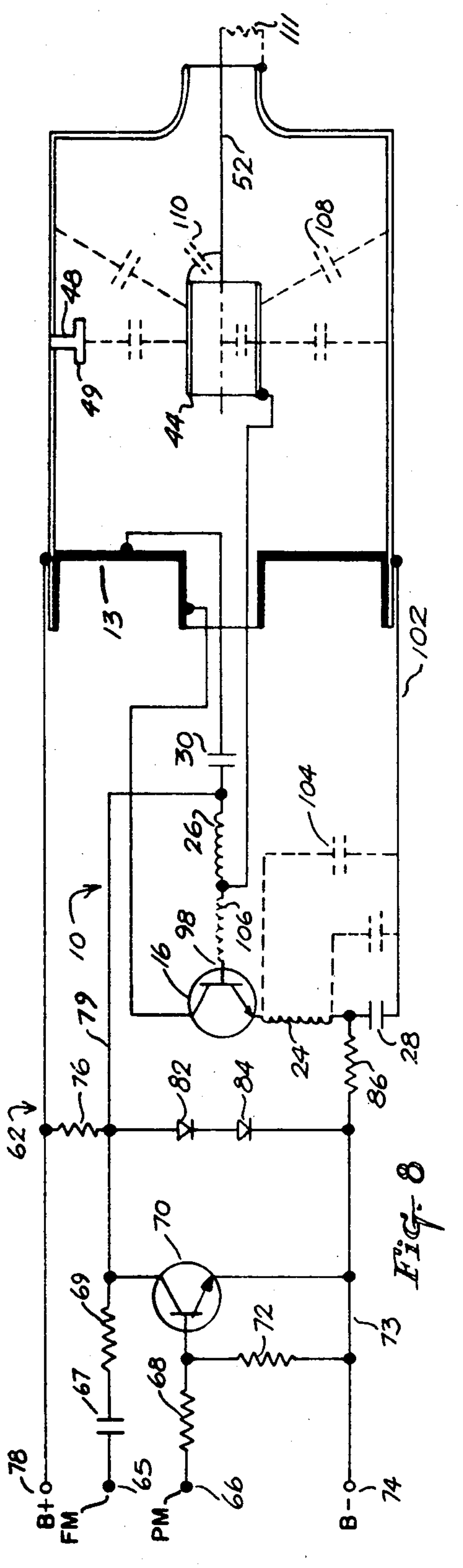
FIG. 8 is a schematic circuit diagram of the oscillator-transmitter of this invention including an input stage.

In FIG. 8, a schematic circuit diagram is shown including the oscillator-transmitter 10 and a circuit 62 provided for supplying bias power and to adapt the unit for receiving frequency modulation, and, alternately, pulse modulation signals.

Circuit 62 is adapted to receive a frequency modulation signal at an input 65, or alternately a pulse modulation signal at an input 66. The input 65 is connected through a direct current blocking capacitor 67 to one end of a resistor 69. The input 66 is connected to a resistor 68 leading to the base of a transistor 70 and to a resistor 72 leading, by a conductor 73, to a B− source of supply voltage 74. The collector of transistor 70 is connected to the other end of resistor 69, through a resistor 76 to a B+ source of supply voltage 78, and by a conductor 79 to the oscillator 10 at the feed-through capacitor 30. The collector, the resistor 69, and resistor 76, are also connected to the anode of a diode 82 serially connected to a diode 84, the cathode of which is connected to conductor 73. The emitter of the transistor 70 is biased through conductor 73 from the B− source 74. The conductor 73 is connected through a resistor 86 to oscillator 10 at the feed-through capacitor 28.

The oscillator 10 includes the transistor 16, the collector of which, as already mentioned, is internally connected to the cap 13 of can 12. The base of the transistor 16 is connected by a line 98 to one end of the coil 26 utilized as a radio frequency choke and which leads to the conductor 79 and feed-through capacitor 30. The choke 26 presents a high impedance to base current at the carrier frequencies so as to prohibit a short circuit or direct conduction to the can 12. The feed-through capacitor 30 extends through disc 14 and is attached, as by soldering, to the disc. The conductive end portion 34 of coil 26 extends through the capacitor 30 which presents a high impedance to direct current and frequency modulation signals on conductor 79. Frequency modulation signals, although being signals of alternating current, have frequencies much lower than the carrier frequencies. As to these signals and direct current, from the bias sources, on conductor 79, the capacitor 30 is effectively an open circuit between conductor 79 and cap 13 of can 12. However, to carrier frequency signals, the capacitor presents a low impedance and is effectively a short circuit.

The base of the transistor is also connected to the center conductor 44. As already mentioned, the end of coil 26 common to the transistor 16, is soldered directly to the center conductor. A base lead inductance is presented by conductor 98 between the base and the center conductor 44 and coil 26. The condition is illustrated by including an inductor 106 shown in dotted lines to present this inductance.

The emitter of the transistor 16 is connected through inductance coil 24 leading to feed-through capacitor 28 and to resistor 86. Coil 24 is a part of a tuned circuit between emitter and collector to maximize power efficiency and which circuit is substantially resonant at the frequency of oscillation. Capacitive reactance in the emitter-to-collector tuned circuit is provided by the stray capacitance existing between the coil 24 and the cap 13 of can 12 which is connected to the collector of transistor 16. This stray capacitance is illustrated as presented by capacitors 104 shown in dotted lines in FIG. 8.

Alternating current at the frequencies of oscillation (the carrier frequencies) is conducted through the feed-through capacitor 28 which presents a low impedance to signals having such frequencies, and which capacitor is attached, as by soldering, to cap 13. The end portion 32 of coil 24 extends through capacitor 28. The electrical representation in FIG. 8 of the feed-through capacitor 28 being connected to can 12 is illustrated by the conductor 102. The feed-through capacitor 28 prevents direct current and modulation signal current conducted through resistor 86 from being conducted direct to can 12.

However, inductor 24 is effectively a short circuit to direct current from the bias supply or B− source 74 which current is limited by the resistor 86. The inductor 24 and the lead from the emitter of transistor 16 also present a stray capacitance between the emitter and can 12. This stray capacitance, illustrated by the capacitors in dotted lines leading from the inductor 24, may be considered as presented by a single capacitor 104 in parallel with the series connection of inductor 24 and feed-through capacitor 28.

A capacitance also exists between the can 12 and the center conductor 44. It represents a distributed cavity capacitance which may be varied by adjustment and radial movement of the tuning screw 48 in bushing 46 soldered within the side of cylinder 15. This distributed capacitance, although illustrated as presented by a plurality of capacitors, as shown in dotted lines in FIG. 8, may nevertheless be considered as presented by a single capacitor 108.

A distributed capacitance also exists between the center conductor 44 and the probe 52 of the coaxial line 51. This coupling capacitance, although illustrated as presented by a plurality of capacitors, as shown in dotted lines in FIG. 8, may nevertheless be considered as presented by a single capacitor 110. The antenna probe 52 presents a load between the center conductor 44 and the cylinder 15 which may be illustrated as presented by a resistor 111 also shown in dotted lines in FIG. 8 and in series with coupling capacitor 110.

Figure 9:
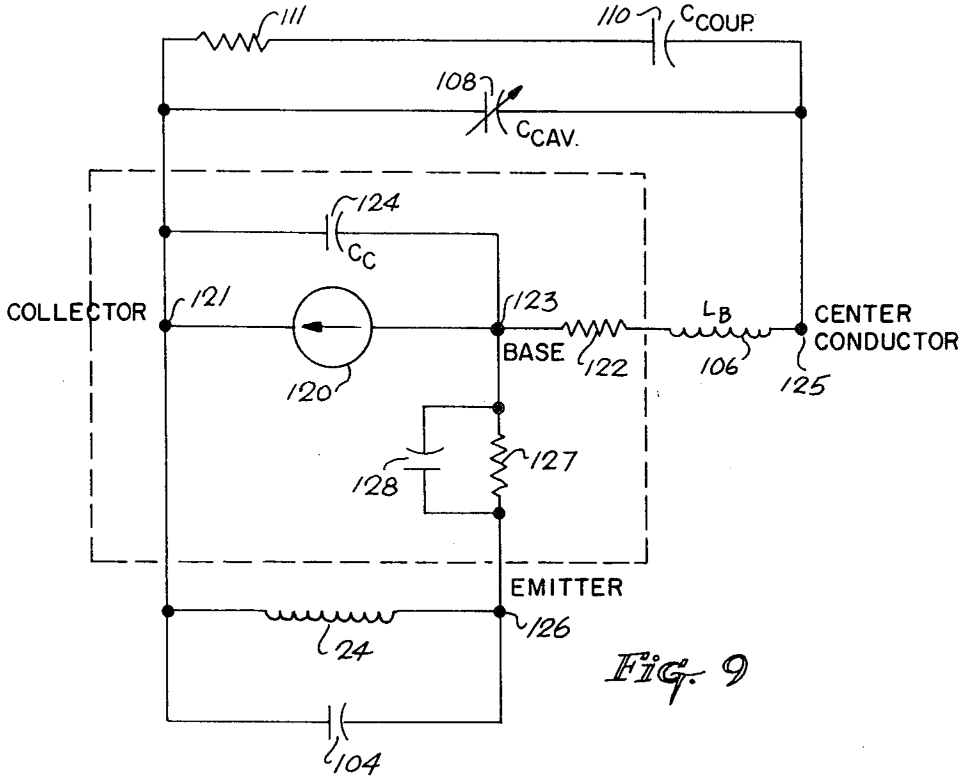
FIG. 9 is an equivalent radiofrequency circuit of the oscillator-transmitter circuit shown in FIG. 8.

Referring to FIG. 9, the equivalent alternating current or radiofrequency circuit of the oscillator 10 is shown. The transistor 16 is replaced by a current source 120 of current magnitude $\alpha i_e$ connected at one end to the junction 121 representing the can 12 and the collector of the transistor 16, wherein $\alpha$ is the conventional terminology for the common base current gain of the transistor and $i_e$ is the emitter current. The current source 120 leads from a junction 123 representing the base of the transistor 16. Junction 123 is connected to a resistor 122 representing the base spreading resistance inherent in the transistor. Resistor 122 is serially connected with inductor 106 representing the base lead inductance in line 98. Inductor 106 leads to junction 125 representing the base center conductor 44. The current source 120 is connected in parallel with a capacitor 124 representing the collector-to-base capacitance inherent within the transistor 16. Junction 123 is also connected to an emitter junction 126 through a parallel combination of a resistor 127, representing the internal emitter resistance of the transistor 16, and a capacitor 128, representing the inherent capacitance from the emitter junction 126 to the base junction 123.

The emitter of transistor 16, as already described with reference to FIG. 8, is connected through the inductor 24 to the collector by way of the conductive can 12. The inductor is therefore illustrated in FIG. 9 as connected to junction 121. As also previously described, the feed-through capacitor 28 is effectively a short circuit to radiofrequency current in the emitter, and therefore is not included in the equivalent circuit of FIG. 9. The stray capacitance between emitter junction 126 and the can 12 is also shown in FIG. 9, illustrated as being presented by capacitor 104 connected in parallel with the inductor 24.

Figure 10:
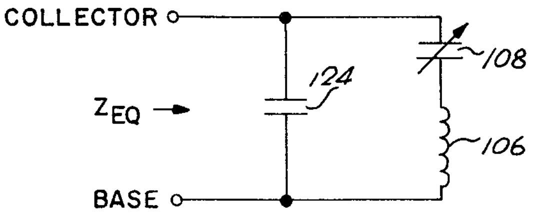
FIG. 10 is an equivalent circuit illustrating the effective collector-to-base impedance of the oscillator-transmitter.

The center conductor 44, as represented in FIG. 8, is capacitively coupled by the effective coupling capacitor 110 to the antenna probe 52 represented by the effective load resistor 111 leading to the collector junction 121. The capacitor 108, having a capacitance substantially equal to the distributed cavity capacitance existing between the center conductor 44 and the cylinder 15 of can 12, is connected in parallel with the series connection of coupling capacitor 110 and the output load represented by resistor 111. The coupling capacitor 110 may be of very small magnitude compared to the collector-to-base capacitance illustrated as presented by capacitor 124, and compared to the distributed cavity capacitance illustrated as presented by capacitor 108 between the cylinder 15, the tuning screw 48, and the center conductor 44. Therefore, the reactance of the path including capacitor 110 and load resistor 111 is substantially greater than the other paths. Further, the reactance presented by the inductor 106 illustrating the reactance due to the base lead inductance, is substantially greater than the inherent base spreading resistance as presented for illustration by resistor 122 in FIG. 9. Therefore, the equivalent collector-to-base impedance may be represented by the circuit as shown in FIG. 10 which excludes resistor 122, capacitor 110 and resistor 111. This equivalent impedance is substantially presented by the capacitive reactance of capacitor 124 in parallel with the net reactance presented by capacitor 108 serially connected to inductor 106. Therefore, $$Z_{Eq}=\frac{X_{C124}(X_{C108}+X_{L106})}{X_{C124}+X_{C108}+X_{L106}} \qquad (1)$$

where $Z_{Eq}$ represents the equivalent collector to base impedance, $X_{C124}$ is the capacitive reactance of capacitor 124, $X_{C108}$ is the capacitive reactance of capacitor 108, and $X_{L106}$ is the inductive reactance of inductor 106.

OPERATION

Figure 11:
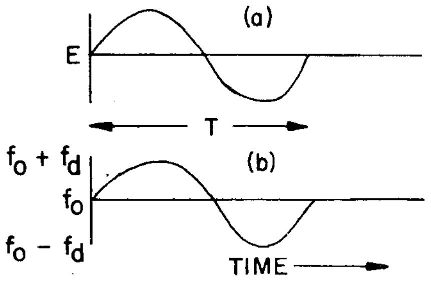
FIGS. 11 and 12 are waveform diagrams illustrating the operation of the oscillator-transmitter, and more particularly illustrating the signals produced in accordance with frequency modulation signals and pulse modulation signals, respectively, applied to the oscillator.

A modulation signal such as provided by a conventional transducer (not shown) responsive to weather and/or other environmental conditions may be applied at the frequency modulation input 65 or the pulse modulation input 66 of the circuit 62. The oscillator 10 is operative with the bias sources 74 and 78 connected through resistors 86 and 76, respectively, to the oscillator as shown. An applied frequency modulation signal is conducted to the base of the transistor 16 of oscillator 10 and varies, in conventional manner, the instantaneous frequency in proportion to the amplitude of the modulation signal, the instantaneous frequency being independent of the modulation frequency. FIG. 11*a* illustrates an applied frequency modulation signal in the form of a sine wave with the period T being equal to the inverse of the modulation frequency. A suitable modulation signal is a 100 kHz. sine wave of peak-to-peak amplitude of 4 volts. A frequency deviation of 3 MHz. in response to the peak modulation signal is suitable so as to yield a modulation index ($M=f_d/f_m$ where $M$ is the modulation index, $f_d$ is the frequency deviation at maximum amplitude of the modulation signal, and $f_m$ is the frequency of the modulation signal) of 3 = $10^6$Hz./100 = $10^3$Hz. = 30. FIG. 11*b* illustrates the instantaneous frequency of the oscillator 10 as a function of time, which frequency varies in accordance with the amplitude of the modulation signals at input 65 about the center or carrier frequency $f_o$ of the oscillator 10. The conductive path of signals at modulation frequencies from line 79 to the base of transistor 16 may be considered as effectively without impedance even though the path includes the radiofrequency choke 26. However, the path from line 79 to cylinder 15 is effectively an open circuit to the signals at modulation frequencies due to capacitor 30.

Figure 12:
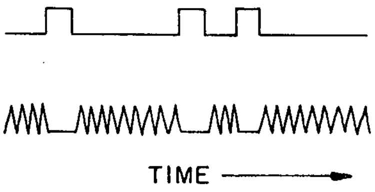

Normally, the NPN-transistor 70 is biased below cutoff and is nonconductive when no pulse is applied at the pulse modulation input 66. In this condition, direct current flows through the resistor 76 and diodes 82, 84 causing the base of NPN-transistor 16 to be biased positive beyond cutoff by the small voltage drop across the internal forward resistance across the diodes. In this condition, transistor 16 oscillates but not otherwise. However, upon the receipt of a pulse at input 66, the transistor 70 is rendered conductive and the diodes 82, 84, serially connected with each other but in parallel with transistor 70, are short circuited as the direct current flows through the lower resistance path of the transistor 70. The base potential of NPN-transistor 16 therefore drops below cutoff to substantially the potential provided by the B− source of supply voltage 74. In this condition, transistor 16 does not oscillate and oscillator 10 is shut off for the duration of the pulse. The output of the transmitter 10 is shown in FIG. **12*b* in accordance with an exemplary set of modulating pulses shown in FIG. 12*a***.

It is well known that at frequencies of oscillation beyond 1,000 MHz. and even lower conventional resonant circuits of lumped elements, particularly capacitors, do not strictly effect reactances normally associated with such elements at low frequencies and tuned circuits having distributed reactance must usually be provided. It has also been established that to sustain oscillations, a net effective inductive reactance must appear in the collector-to-base circuit; that is, the collector-to-base impedance must have a positive phase angle. This phenomena has been described in an article entitled, "An Analysis of the Modes of Operation of a Simple Transistor Oscillator," by J. F. Gibbons, *Proceedings of the I.R.E.*, Vol. 49, No. 9, Page 1,383, (Sept. 1961).

To achieve such relation it is necessary to offset the limitations at high radiofrequencies of the collector-to-base capacitance presenting a low collector-to-base capacitive reactance whereby the equivalent collector-to-base impedance has a net capacitive reactance. The inherent collector-to-base capacitance of the transistor 16 is illustrated as presented by capacitor 124 in FIG. 9. Further, it is necessary to provide a collector-to-base inductance, which while being necessarily in effective parallel relation with capacitor 124, is not so large as to cause a high inductive reactance whereby a greater current would flow in capacitor 124 so that the net collector-to-base impedance would still have a net capacitive reactance. Although a transistor may be chosen having a low collector-to-base capacitance, the reactance presented by this capacitance, illustrated as presented by capacitor 124, might still be lower at high frequencies than the inductive reactance due only to lead inductance, illustrated as presented by inductor 106, which in the invention is substantially the only collector-to-base inductance. In order to decrease the net inductive reactance, the invention utilizes the cavity capacitance, illustrated as presented by capacitor 108, effectively in series with the base lead inductance illustrated as presented by inductor 106. However, if the capacitive reactance of capacitor 108 exceeds the inductive reactance of inductor 106, the equivalent circuit impedance would again be capacitive and oscillation could not be sustained. The capacitor 108 is therefore utilized only to decrease the net inductive reactance to a value below the capacitive reactance presented by capacitor 124. The frequency of oscillation may be varied in accordance with the amount of the net inductive reactance. This may be accomplished by turning the tuning screw 48 in appropriate direction to effect radial movement of the head or plate portion 49 thereof within the cavity 20 which varies the cavity capacitance, illustrated as presented by the capacitor 108, to change the capacitive reactance in series with the inductive reactance of the lead illustrated as presented by inductor 106. The oscillator built, as already mentioned, in accordance with the invention, had a manual tuning range of ± 15 MHz. from 1,680 MHz.

It may be appreciated that the exact sizes and positions of elements within the cylinder 15 is not crucial as long as the aforementioned relations still exist. For instance, the cavity capacitance, illustrated as presented by capacitor 108, may be increased by a larger cylinder 44, decreased by smaller plate 49 on tuning screw 48, and so on in accordance with well-known relations of capacitance existing between conductors. Further, the capacitance, illustrated as presented by capacitor 110, between cylindrical conductor 44 and probe 52 is similarly affected by relative sizes and position of the conductor and probe.

Other values for the parameters of the aforementioned oscillator 10 having a transistor such as NPN-transistor 16 chosen to maximize the conditions of oscillation and built in accordance with the invention are as follows:

Capacitor 124 (representing the internal transistor collector-to-base capacitance): 3 picofarads ($X_{C124} = -j29$ ohms at 1,680 MHz.).

Capacitor 108 (schematically illustrating the cavity capacitance between the center conductor 44 and the cylinder 15): 2 picofarads ($X_{C108} = -j47$ ohms at 1,680 MHz.).

Inductor 106 (schematically illustrating the base lead inductance of conductor 98): 6 nanohenries ($X_{L106} = +j63$ ohms at 1,680 MHz.). Using the equation as described in (1) above:

$$Z_{Eq.} = \frac{(-j29)(-j47+j63)}{-j29+j47+j63} = \frac{+464}{-j13} = +j35 \text{ ohms}$$

It is readily apparent in this example that the equivalent impedance including parasitic impedance, between the collector and base of the transistor 16 using the typical parameters has a net inductive reactance and oscillations may therefore be sustained.

Since the equivalent and effective collector-to-base impedance must be inductive at the frequencies of oscillation, the resonant frequency of the circuit of FIG. 10 occurs above the frequency of oscillation. Using the above parameters, the resonant frequency of the equivalent circuit of FIG. 10, and as substantially experienced in the aforementioned oscillator built in accordance with the invention, is 1,880 MHz., the output frequency of the oscillator being 1,680 MHz.

To maximize power efficiency, it has been recognized that a tuned circuit should be included in the collector-to-emitter circuit of the oscillator and should resonate at substantially the frequency of oscillation. Although the requirement at first appears simple enough to meet the requirement (a) with small and compact elements, and (b) with elements that present a relatively stable impedance at the high oscillation or carrier frequencies including frequencies at the frequency deviation in using the apparatus as a frequency modulated oscillator, and (c) under the adverse conditions to which the apparatus may be subjected, may be a sophisticated problem. The tuned collector-to-emitter circuit in the invention includes the small inductor 24 connected between the emitter of transistor 16 and the feed-through capacitor 28. The equivalent collector-to-emitter circuit is illustrated between the emitter junction 126 and collector junction 121 in FIG. 9. The invention utilizes the stray capacitance existing between successive turns in the inductor 24 and between the turns and the disc portion 14 of the cap 13. The small inductor 24 presents an inductive reactance effectively in parallel with the stray capacitance which is illustrated as presented by the single capacitor 104 leading from the emitter of transistor 16. The stray capacitance may be varied by varying the distance of the inductor 24 alongside the disc portion 14 of cap 13. The position so determined for maximum signal strength corresponding to the position at which the circuit is substantially tuned, should thereafter be maintained constant. The stray capacitance may also be affected by the type of dielectric material used as the sleeve 36 in FIG. 6, between the inductor 24 and the disc portion 14. For this reason, and as already mentioned, a material is chosen having dielectric properties which remain stable over the contemplated temperature ranges of the environment to which the oscillator is to be exposed. Further, since the oscillator 10 may be subjected to shock and vibrations, it may be desirable to utilize a small printed circuit (not shown) having the dielectric material thereof secured such as by utilization of an adhesive to the disc portion 14 of the cap, so as to present the inductance of the inductors 24 and 26, and in lieu of these inductors.

Further, in order for the equivalent impedance to have the net inductive reactance, the capacitive reactance in the one leg, the capacitance being illustrated as presented by capacitor 124, should be greater than the net reactance in the other leg of the equivalent impedance circuit of FIG. 10. In the example, the ratio of capacitive reactance in the one leg to inductive net reactance in the other leg at the oscillation frequency of 1,680 MHz. is approximately 2:1.

Although only one embodiment of the invention has been shown and described, various modifications as may be apparent to those skilled in the art are intended to be within the contemplation of the invention and defined in scope by the claims.

What is claimed is:

1. A radiofrequency oscillator comprising:

an electrically conductive cylinder;

an electrically conductive cap adapted to mate within one end of said cylinder and having an opening therein;

a dielectric support mounted within the cylinder;

a cylindrical conductor suspended within the cylinder on the dielectric support;

a transistor having a base, collector, and emitter, said transistor being received in the opening in said cap, the collector of said transistor being connected with said cap, and the base being connected with said suspended cylindrical conductor;

tuning means to vary the impedance between said suspended conductor and cylinder;

an inductor enclosed within said cylinder, spaced a predetermined distance from said cap and connected between the emitter of said transistor and said cylinder;

a choke inductor connected to the base of said transistor and enclosed within said cylinder;

first coupling means extending from said first-mentioned inductor through said cap so as to present a low impedance between said first coupling means and said cap to radiofrequency signals and a high impedance to lower frequency and direct current signals;

second coupling means extending from said choke inductor through said cap so as to present a low impedance between said coupling means and cap to radiofrequency signals and a high impedance to lower frequency and direct current signals;

a portion of the signal at the collector of said transistor being fed back to the base to produce an oscillatory signal; the tuning means being utilized to vary the phase of the portion of the signal fed back so as to vary the frequency of the oscillatory signal; capacitance existing between said inductor and cap being varied by varying the position of said first-mentioned inductor so as to optimize the power efficiency of said oscillator; said first and second coupling means permitting conduction of low frequency and direct current signals through said cap to said first-mentioned inductor and choke inductor, respectively, while preventing such signals conducted by said coupling means from being conducted by said cap and cylinder; and said cap and cylinder shielding oscillatory signal energy radiated from said suspended conductor, and said first-mentioned and choke inductors.

2. A radiofrequency oscillator comprising:

an electrically conductive cylinder;

an electrically conductive cap adapted to mate with one end of said cylinder and having an opening therein;

a dielectric support mounted within the cylinder;

a cylindrical conductor suspended within the cylinder on the dielectric support;

a transistor having a base, collector, and emitter, said transistor being received in the opening in said cap, the collector of said transistor being connected with said cap, and the base being connected with said suspended cylindrical conductor;

tuning means to vary the impedance between said suspended conductor and cylinder;

an inductor enclosed within said cylinder, spaced a predetermined distance from said cap and connected between the emitter of said transistor and said cylinder;

a choke inductor connected to the base of said transistor and enclosed within said cylinder;

a portion of the signal at the collector of said transistor being fed back to the base to produce an oscillatory signal; the tuning means being utilized to vary the phase of the portion of the signal fed back so as to vary the frequency of the oscillatory signal; capacitance existing between said inductor and cap being varied by varying the position of said first-mentioned inductor so as to optimize the power efficiency of said oscillator; and said cap and cylinder shielding oscillatory signal energy radiated from said suspended conductor and said first-mentioned and choke inductors.

3. A radiofrequency oscillator comprising:

an electrically conductive cylinder;

an electrically conductive cap adapted to mate with one end of said cylinder and having an opening therein;

a dielectric support mounted within the cylinder;

a cylinder conductor suspended within the cylinder on the dielectric support;

a transistor having a base, collector and emitter, said transistor being received in the opening in said cap, the collector of said transistor being connected with said cap, and the base being connected with said suspended cylindrical conductor;

tuning means to vary the impedance between said suspended conductor and cylinder;

a portion of the signal at the collector of said transistor being fed back to the base to produce an oscillatory signal; the tuning means being utilized to vary the phase of the portion of the signal fed back so as to vary the frequency of the oscillatory signal; and said cap and cylinder shielding oscillatory signal energy radiated from said suspended conductor.

4. An oscillator as defined by claim 3 including probe means within the cylindrical conductor and extending outwardly from the conductive cylinder, an oscillatory signal being produced at the probe means and a portion of the signal being fed back to the base, and the phase of the portion of the signal fed back to the base being variable by adjusting the tuning means so as to effect a corresponding variation between predetermined limits of the frequency of the oscillatory signal.

5. An oscillator as defined by claim 3 wherein said tuning means includes an adjustable screw positioned on and through said conductive cylinder.

6. A radiofrequency oscillator producing a carrier signal for use in a transmitter having means for modulating the carrier signal, said oscillator comprising;

an electrically conductive cylinder;

an electrically conductive cap adapted to mate with one end of said cylinder and having an opening therein;

a dielectric support mounted within the cylinder;

a cylindrical conductor suspended within the cylinder on the dielectric support;

a transistor having first, second, and third electrodes, said transistor being received in the opening in said cap, the first electrode of said transistor being connected with said cap, and the second electrode being connected with said suspended cylindrical conductor;

tuning means to vary the impedance between said suspended conductor and cylinder;

an inductor enclosed within said cylinder, spaced a predetermined distance from said cap and connected between the third electrode of said transistor and said cylinder;

a choke inductor connected to the second electrode of said transistor and enclosed within said cylinder;

first coupling means extending from said first-mentioned inductor through said cap so as to present a low impedance between said first coupling means and said cap to radiofrequency signals and a high impedance to lower frequency and direct current signals;

second coupling means extending from said choke inductor through said cap so as to present a low impedance between said coupling means and cap to radiofrequency signals and a high impedance to lower frequency and direct current signals;

a portion of the signal at the first electrode of said transistor being fed back to the second electrode to produce an oscillatory signal; the tuning means being utilized to vary the phase of the portion of the signal fed back so as to vary the frequency of the oscillatory signal; capacitance existing between said inductor and cap being varied by varying the position of said first-mentioned inductor so as to optimize the power efficiency of said oscillator; said first and second coupling means permitting conduction of low frequency and direct current signals through said cap to said first-mentioned inductor and choke inductor, respectively, while preventing such signals conducted by said coupling means from being conducted by said cap and cylinder; and said cap and cylinder shielding oscillatory signal energy radiated from suspended conductor and said first-mentioned and choke inductors.

7. An oscillator as defined by claim 6 including probe means within the cylindrical conductor and extending outwardly from the conductive cylinder, an oscillatory signal being produced at the probe means and a portion of the signal being fed back to the second electrode, and the phase of the portion of the signal fed back to the second electrode being variable by adjusting the tuning means so as to effect a corresponding variation between predetermined limits of the frequency of the oscillatory signal.

8. A radiofrequency oscillator comprising:

an electrically conductive cylinder;

an electrically conductive cap adapted to mate with one end of said cylinder;

a dielectric support mounted within the cylinder;

a cylindrical conductor suspended within the cylinder on the dielectric support;

a transistor having a base, collector, and emitter, said transistor being mounted to said cap, the collector of said transistor being connected with said cap, and the base being connected with said suspended cylindrical conductor;

an inductor enclosed within said cylinder, spaced a predetermined distance from said cap and connected between the emitter of said transistor and said cylinder;

a choke inductor connected to the base of said transistor and enclosed within said cylinder;

first coupling means extending from said first-mentioned inductor through said cap so as to present a low impedance between said first coupling means and said cap to first predetermined signals and a high impedance to second predetermined signals;

second coupling means extending from said choke inductor through said cap so as to present a low impedance between said coupling means and cap to said first predetermined signals and a high impedance to said second predetermined signals;

a portion of the signal at the collector of said transistor being fed back to the base to produce an oscillatory signal; capacitance existing between said inductor and cap being varied by varying the position of said first-mentioned inductor so as to optimize the power efficiency of said oscillator; said first and second coupling means permitting conduction of said second predetermined signals through said cap to said first-mentioned inductor and choke inductor, respectively, while preventing such signals conducted by said coupling means from being conducted by said cap and cylinder; and said cap and cylinder shielding oscillatory signal energy radiated from said suspended conductor and said first-mentioned and choke inductors.

* * * * *